United States Patent
Matsubara et al.

(10) Patent No.: US 9,992,375 B2
(45) Date of Patent: Jun. 5, 2018

(54) IMAGE READING DEVICE ILLUMINATING A WHITE REFERENCE MEMBER AT A LOWER LUMINOUS INTENSITY TO GENERATE BLACK CORRECTION DATA FOR SHADING CORRECTION

(71) Applicant: Panasonic Intellectual Property Management Co., Ltd., Osaka (JP)

(72) Inventors: Ryo Matsubara, Osaka (JP); Hirotsugu Fusayasu, Kyoto (JP); Katsuo Inokuchi, Fukuoka (JP); Tatsuya Hirota, Fukuoka (JP); Yuuichi Tutiya, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days. days.

(21) Appl. No.: 15/415,067

(22) Filed: Jan. 25, 2017

(65) Prior Publication Data

US 2017/0134613 A1    May 11, 2017

Related U.S. Application Data

(63) Continuation of application No. PCT/JP2016/000178, filed on Jan. 15, 2016.

(30) Foreign Application Priority Data

Mar. 19, 2015   (JP) ................. 2015-056556

(51) Int. Cl.
    *H04N 1/00*     (2006.01)
    *H04N 1/028*    (2006.01)
    *H04N 1/12*     (2006.01)
    *H04N 1/19*     (2006.01)
    *H04N 1/191*    (2006.01)
    *H04N 1/193*    (2006.01)
    *H04N 1/031*    (2006.01)

(Continued)

(52) U.S. Cl.
    CPC ......... *H04N 1/401* (2013.01); *H04N 1/00005* (2013.01); *H04N 1/00013* (2013.01);
    (Continued)

(58) Field of Classification Search
    CPC ........... H04N 1/00002; H04N 1/00013; H04N 1/00018; H04N 1/00034; H04N 1/00039;
    (Continued)

(56) References Cited

U.S. PATENT DOCUMENTS

| 4,974,072 A | 11/1990 | Hasegawa |
| 5,206,501 A | 4/1993 | Sakakibara et al. |

(Continued)

FOREIGN PATENT DOCUMENTS

| JP | 62-047274 A | 2/1987 |
| JP | H01-101061 A | 4/1989 |

(Continued)

*Primary Examiner* — Scott A Rogers
(74) *Attorney, Agent, or Firm* — McDermott Will & Emery LLP

(57) ABSTRACT

An image reading device includes: a sensor module having a light source and a plurality of sensors; a white reference plate; and an image processor that generates correction data to be used for shading correction and performs the shading correction on image signals, using the correction data. The light source is configured to switch between at least a first luminous intensity and a second luminous intensity lower than the first luminous intensity. The image processor acquires intermediate data by causing the plurality of sensors to acquire an image signal of the white reference plate illuminated with the second luminous intensity, generates black correction data, based on the intermediate data, and performs the shading correction, using the black correction data, so that a density unevenness, in an image, caused by interference between image signals from the plurality of sensors.

18 Claims, 12 Drawing Sheets

(51) Int. Cl.
  *H04N 1/40* (2006.01)
  *H04N 1/401* (2006.01)
  *H04N 1/407* (2006.01)

(52) U.S. Cl.
  CPC ..... *H04N 1/00018* (2013.01); *H04N 1/00034* (2013.01); *H04N 1/00039* (2013.01); *H04N 1/00045* (2013.01); *H04N 1/00053* (2013.01); *H04N 1/00063* (2013.01); *H04N 1/00068* (2013.01); *H04N 1/00082* (2013.01); *H04N 1/00087* (2013.01); *H04N 1/02815* (2013.01); *H04N 1/031* (2013.01); *H04N 1/0311* (2013.01); *H04N 1/0318* (2013.01); *H04N 1/12* (2013.01); *H04N 1/125* (2013.01); *H04N 1/19* (2013.01); *H04N 1/191* (2013.01); *H04N 1/193* (2013.01); *H04N 1/40006* (2013.01); *H04N 1/40056* (2013.01); *H04N 1/4076* (2013.01); *H04N 2201/0081* (2013.01)

(58) Field of Classification Search
  CPC ............. H04N 1/00045; H04N 1/0005; H04N 1/00053; H04N 1/00063; H04N 1/00068; H04N 1/00082; H04N 1/00087; H04N 1/028; H04N 1/02885; H04N 1/047; H04N 1/40; H04N 1/40006; H04N 1/401; H04N 1/407; H04N 1/6027
  See application file for complete search history.

(56) References Cited

U.S. PATENT DOCUMENTS

| | | | | |
|---|---|---|---|---|
| 5,371,613 A | * | 12/1994 | Arimoto | H04N 1/401 358/461 |
| 6,151,419 A | * | 11/2000 | Aoki | H04N 1/401 358/461 |
| 7,126,725 B2 | * | 10/2006 | Okutomi | H04N 1/1013 358/474 |
| 7,391,533 B2 | | 6/2008 | Hiromatsu | |
| 7,619,785 B2 | | 11/2009 | Sodeura et al. | |
| 8,390,900 B2 | * | 3/2013 | Sakane | H04N 1/00002 358/461 |
| 8,854,698 B2 | * | 10/2014 | Uchida | H04N 1/4076 347/234 |
| 8,917,423 B2 | * | 12/2014 | Kurakata | H04N 1/04 358/2.1 |
| 9,525,800 B2 | * | 12/2016 | Horiguchi | H04N 1/4076 |
| 9,769,347 B2 | * | 9/2017 | Chen | H04N 1/04 |
| 2003/0072497 A1 | | 4/2003 | Hiromatsu | |
| 2005/0206968 A1 | | 9/2005 | Sodeura et al. | |
| 2008/0055668 A1 | | 3/2008 | Hirayama | |
| 2008/0204782 A1 | | 8/2008 | Hiromatsu | |
| 2008/0204820 A1 | | 8/2008 | Ito | |
| 2010/0315687 A1 | * | 12/2010 | Sakane | H04N 1/00002 358/461 |
| 2012/0069227 A1 | | 3/2012 | Hasuo | |
| 2017/0054872 A1 | * | 2/2017 | Fusayasu | H04N 1/19 |
| 2017/0078527 A1 | * | 3/2017 | Fusayasu | H04N 1/00018 |
| 2017/0094114 A1 | * | 3/2017 | Inokuchi | H04N 1/401 |
| 2017/0214827 A1 | * | 7/2017 | Sasaki | H04N 1/00801 |

FOREIGN PATENT DOCUMENTS

| | | |
|---|---|---|
| JP | H02-254867 A | 10/1990 |
| JP | 05-063978 A | 3/1993 |
| JP | 2003-198813 A | 7/2003 |
| JP | 2005-269545 A | 9/2005 |
| JP | 2008-060975 A | 3/2008 |
| JP | 2012-070089 A | 4/2012 |
| JP | 5007133 B2 | 8/2012 |

\* cited by examiner

IMAGE READING DEVICE ILLUMINATING A WHITE REFERENCE MEMBER AT A LOWER LUMINOUS INTENSITY TO GENERATE BLACK CORRECTION DATA FOR SHADING CORRECTION

RELATED APPLICATIONS

This application is a continuation of International Application No. PCT/JP2016/000178, filed on Jan. 15, 2016, which in turn claims the benefit of Japanese Application No. 2015-056556, filed on Mar. 19, 2015, the disclosures of which are incorporated by reference herein.

BACKGROUND

1. Technical Field

The present disclosure relates to an image reading device that reads an image of an object.

2. Description of the Related Art

Unexamined Japanese Patent Publication No. 2008-060975 discloses an image reading device including a white reference plate. The image reading device acquires white reference data from an output of a sensor when an image of the white reference plate with a light source turned on is acquired. In addition, the image reading device acquires black reference data from an output of the sensor with the light source turned off. The image reading device performs shading correction, based on the thus acquired white reference data and black reference data.

SUMMARY

An image reading device of the present disclosure includes: a sensor module including a light source to illuminate an object and a plurality of sensors to read light reflected from the object to acquire an image signal; a reference member having an white area; a data generator that generates correction data to be used for shading correction; and a corrector that performs, by using the correction data, the shading correction on the image signal acquired by the plurality of sensors.

With this configuration, unevenness in image density caused by the interference between the image signals from the plurality of sensors can be reduced.

DETAILED DESCRIPTION

In the following, exemplary embodiments will be described in detail with reference to the drawings appropriately. However, an unnecessarily detailed description will not be given in some cases. For example, a detailed description of a well-known matter and a duplicated description of substantially the same configuration will be omitted in some cases. This is to avoid the following description from being unnecessarily redundant and thus to help those skilled in the art to easily understand the description.

Note that the inventors of the present disclosure provide the accompanying drawings and the following description to help those skilled in the art to sufficiently understand the present disclosure, but do not intend to use the drawings or the description to limit the subject matters of the claims.

BACKGROUND OF THE DISCLOSURE

In an image reading device such as a scanner that reads a document and then forms image data, there is a distortion which depends on the position of pixels, due to unevenness in light receiving elements of a sensor module such as a CCD (Charge Coupled Device) and a CIS (Contact Image Sensor), due to the difference of light converging performance between a central part and a peripheral part of a lens, and due to unevenness in a light amount distribution of a light source.

To address this problem, there is known an image reading device in which shading correction is performed on acquired image data. Further, there is known an image forming apparatus such as a multifunction peripheral and a copy machine including such an image reading device.

However, a density unevenness is generated in an image in some cases in a configuration in which a plurality of sensors are arranged in a main scanning direction and in which the image signals constitute an image signal on a line extending in the main scanning direction, and the unevenness is caused by the interference between the outputs from the plurality of sensors. Such a density unevenness, however, cannot be corrected sufficiently only by conventional shading correction.

In view of the above, in order to solve the issue as described above, the present disclosure provides an image reading device in which the density unevenness in the image due to the interference between the outputs from the plurality of sensors is reduced.

First Exemplary Embodiment

1. Configuration

[1-1. Multifunction Peripheral]

Figure 1:
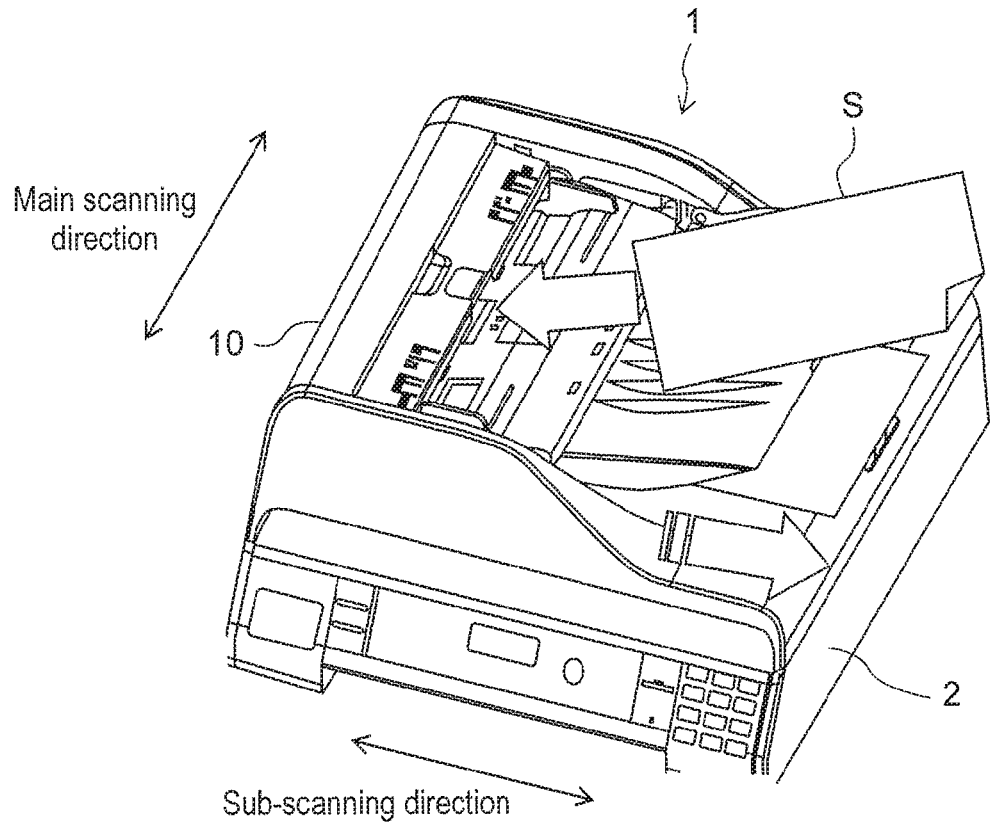
FIG. 1 is a perspective view of a multifunction peripheral in a first exemplary embodiment.
Figure 2:
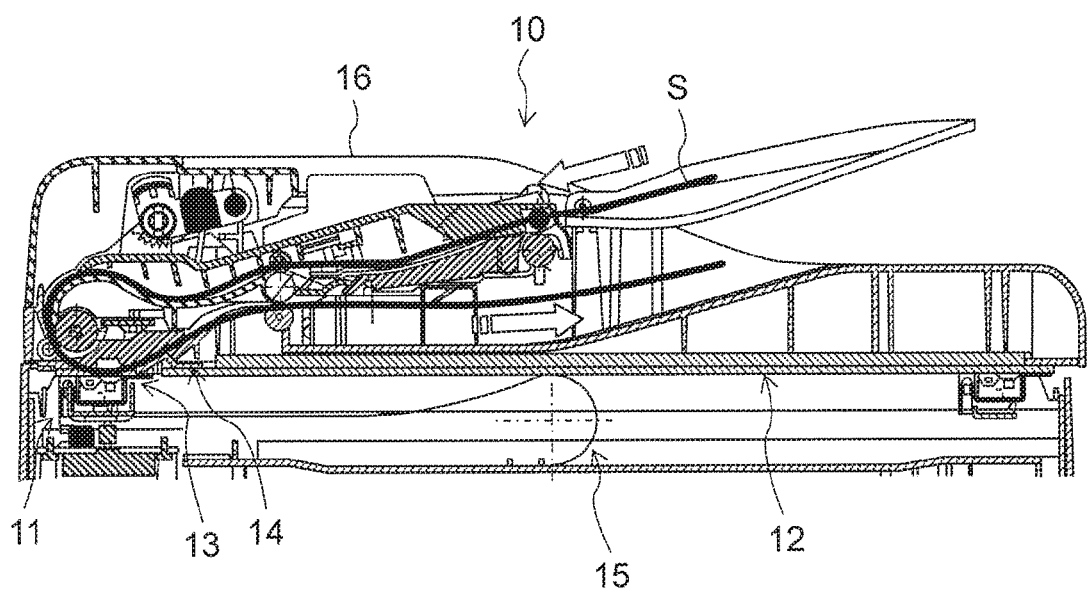
FIG. 2 is a sectional view of the multifunction peripheral in the first exemplary embodiment.

A description will be given, with reference to FIGS. 1 and 2, on a hardware configuration of a multifunction peripheral 1 including image reading device 10 in a first exemplary embodiment. FIG. 1 is a perspective view of multifunction peripheral 1 in the first exemplary embodiment. FIG. 2 is a sectional view of multifunction peripheral 1 in the first exemplary embodiment.

Multifunction peripheral 1 includes main unit 2 and image reading device 10 mounted on an upper part of main unit 2. Multifunction peripheral 1 has a scan function performed by image reading device 10, and in addition, other functions (for example, a print function, a copy function, a facsimile transmission/reception function, and the like).

Image reading device 10 is an FB (Flat Bed) type image scanner as shown in FIGS. 1 and 2. Image reading device 10 has scanner unit 11, FB glass 12, ADF glass 13, white reference plate 14, ADF (Auto Document Feeder) 16, and controller 100 (see FIG. 5).

FB glass 12 and ADF glass 13 are disposed on an upper surface of main unit 2. FB glass 12 occupies the most part of the upper surface of main unit 2. On FB glass 12, document S is to be placed as a reading object. ADF glass 13 reads document S fed by ADF 16.

ADF 16 is disposed on main unit 2 such that ADF 16 covers FB glass 12 and ADF glass 13. ADF 16 feeds document S automatically.

Scanner unit 11 moves in main unit 2 along bottom surfaces of FB glass 12 and ADF glass 13. The direction in which scanner unit 11 moves is referred to as a sub-scanning direction. FB glass 12 and ADF glass 13 are arranged in the sub-scanning direction. Scanner unit 11 acquires an image of a reading object. Scanner unit 11 is driven by a motor (not shown) and moves in the sub-scanning direction along a guide member (not shown). The motor is controlled by controller 100. Scanner unit 11 is connected to controller 100 through FFC (Flexible Flat Cable) 15. Further, scanner unit 11 has sensor module 102 (see FIG. 5).

White reference plate 14 is used to acquire data for correction. White reference plate 14 is disposed on the upper part of main unit 2 and between FB glass 12 and ADF glass 13. White reference plate 14 is disposed to face inside of main unit 2, in other words, to face scanner unit 11. White reference plate 14 is an example of a reference member.

FFC 15 is a communication cable having signal lines therein. FFC 15 is long enough and flexible enough for scanner unit 11 to move smoothly within the movable range.

Figure 3:
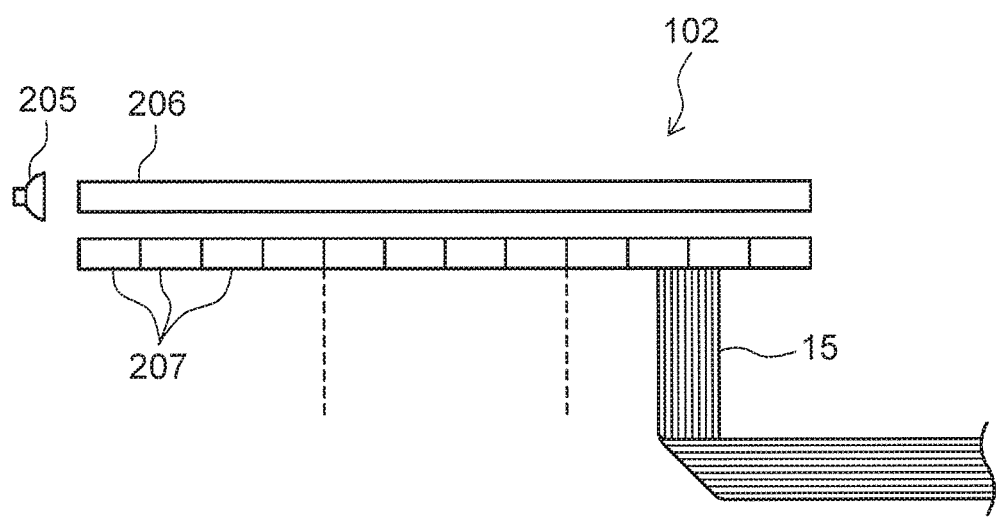
FIG. 3 is a schematic diagram of a sensor module in the first exemplary embodiment.

FIG. 3 is a schematic diagram of sensor module 102 of the first exemplary embodiment. Sensor module 102 is of the contact image sensor type in the present exemplary embodiment, that is, the CIS type. Sensor module 102 has light source 205 and a plurality of sensors 207.

Plurality of sensors 207 is arranged in the main scanning direction perpendicular to the sub-scanning direction. Typically, sensors 207 are made up of sensor ICs and are, for example, CMOS image sensors. One of sensors 207 includes a plurality of pixels (photoelectric convertors) arranged in the main scanning direction. There is provided a rod lens array (not shown) above sensors 207. Light converged by the rod lens array enters sensors 207.

Sensors 207 are divided into a plurality of sectors. The received light is converted into image signals, and the converted image signals are output from each of the sectors. That is, the sector is a group of sensors 207 that output the image signals in a group. For example, in a case where the number of sensors 207 is 12 and that sensors 207 are divided into three sectors, each sector includes four sensors 207. Sensors 207 output the image signals to controller 100 through FFC 15.

Light source 205 is typically an LED. For example, light source 205 is made up of three LEDs of red (R), green (G), and blue (B). Light source 205 can switch luminous intensity by adjusting a voltage applied to the LEDs. Light source 205 is disposed on one end (the left end of FIG. 3) of sensor module 102, in the main scanning direction. Sensor module 102 has light guide 206. The light from light source 205 is emitted upward through light guide 206, concretely speaking, toward FB glass 12, ADF glass 13, or white reference plate 14. Since light source 205 and light guide 206 are disposed in the vicinity of sensors 207, the light reflected by document S on FB glass 12 or ADF glass 13 or reflected by white reference plate 14 enters sensors 207 through the rod lens array.

Figure 4:
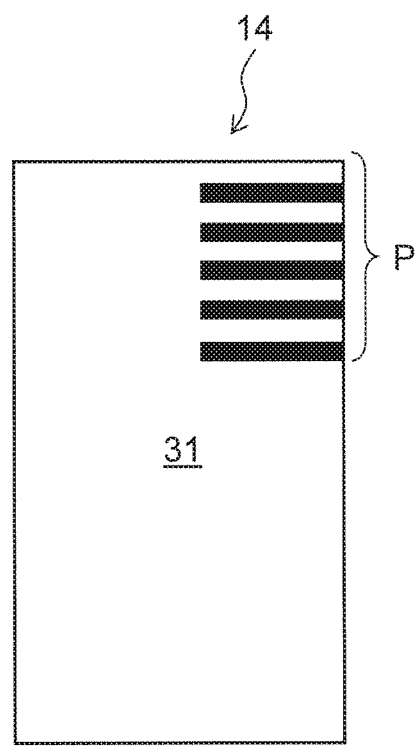
FIG. 4 is a schematic diagram of a white reference plate in the first exemplary embodiment.

FIG. 4 is a schematic diagram of white reference plate 14 in the first exemplary embodiment. The most part of white reference plate 14 is occupied by white area 31, and reference pattern P is provided on the part that is not used for data acquisition to be described later. Inside image reading device 10, white reference plate 14 extends in the main scanning direction. White reference plate 14 has a length, in the main scanning direction, longer than sensor module 102 (more specifically, the row of the plurality of sensors 207). On white reference plate 14, white area 31 is disposed at least on the surface opposed to sensor module 102 such that white area 31 extends over the whole length of sensor module 102 in the main scanning direction. Further, reference pattern P provided on white reference plate 14 is a pattern for indicating a home position. As reference pattern P, any pattern can be employed as long as image processor 204 (see FIG. 5) can identify the pattern. For example, reference pattern P may be a plurality of black lines that are arranged in the main scanning direction and extend in the sub-scanning direction. White reference plate 14 is an example of the reference member.

[1-2. Image Reading Device]

Figure 5:
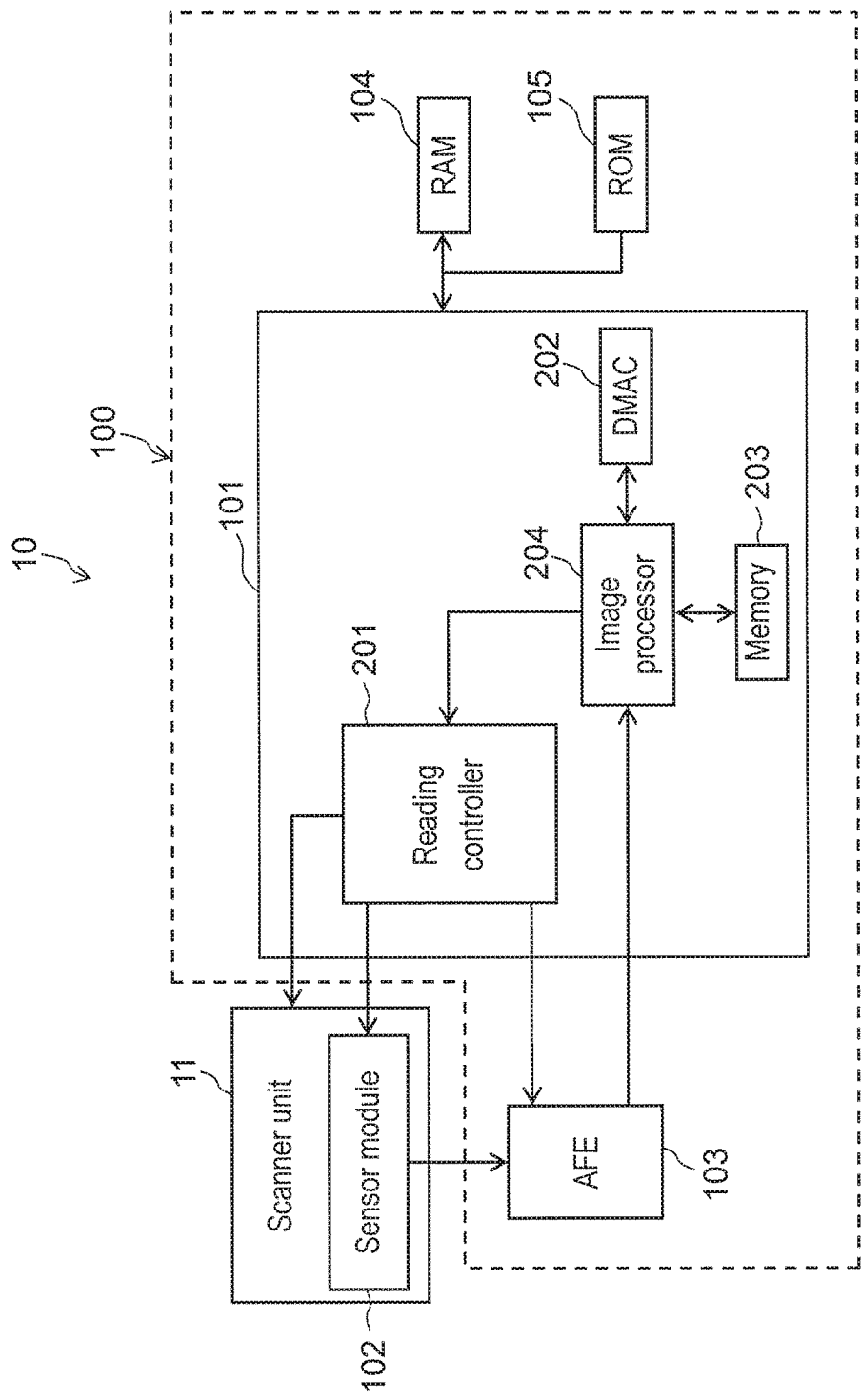
FIG. 5 a block diagram of an image reading device in the first exemplary embodiment.

FIG. 5 is a block diagram of image reading device 10 in the first exemplary embodiment.

As shown in FIG. 5, image reading device 10 includes scanner unit 11 and controller 100.

Controller 100 controls an image reading operation of scanner unit 11 and performs image processing on the image signal being output from scanner unit 11. Controller 100 has CPU 101, AFE (Analog Front End Circuit) 103, RAM (Random Access Memory) 104, and ROM (Read Only Memory) 105.

The image signal (analog signal) is input to AFE 103 from sensor module 102 of scanner unit 11. AFE 103 has an analog-to-digital converter, an amplifier, and the like. AFE 103 amplifies, by the amplifier, the image signal from sensor module 102, adds or subtracts an offset to or from the amplified image signal, converts the signal by the analog-to-digital converter into a digital signal (image data), and outputs the digital signal to CPU 101.

RAM 104 stores the image data acquired by CPU 101. ROM 105 stores a predetermined program necessary to the image processing on CPU 101.

CPU 101 has reading controller 201, DMAC (Direct Memory Access Controller) 202, memory 203, and image processor 204.

Reading controller 201 controls operations of scanner unit 11 (including sensor module 102), ADF 16, and AFE 103. For example, reading controller 201 switches the luminous intensity of light source 205 by adjusting the voltage supplied to light source 205. Further, reading controller 201 controls driving of the motor (not shown) for conveying document S set on ADF 16.

Image processor 204 performs the image processing on the image signal being input from AFE 103. Image processor 204 performs the image processing by reading out the program stored in ROM 105 and by executing the read-out program. Although a detailed description will be given later, image processor 204 performs various image processing such as a filtering process and a shading correction process. Image processor 204 is an example of the data generator and an example of the corrector.

DMAC 202 performs a data transfer process that transfers the image signal acquired by the image processing performed by image processor 204.

Memory 203 stores various data. For example, memory 203 stores the data representing the luminous intensity corresponding to the voltage applied to light source 205. Further, memory 203 stores the data to be used for the shading correction.

[2. Operations]

[2-1. Image Reading Operation]

Figure 6:
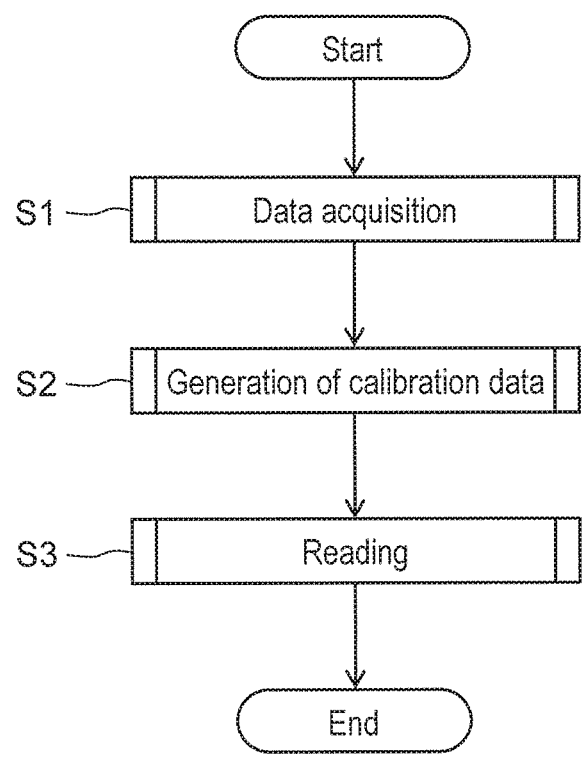
FIG. 6 a flowchart of an image reading operation of the image reading device in the first exemplary embodiment.

The operation of image reading device 10 will be described. FIG. 6 is a flowchart of the image reading operation of image reading device 10 in the first exemplary embodiment.

The image reading operation starts when a power source of image reading device 10 is turned on and an operation of a user is then received. First, in step S1, image processor 204 acquires the data for generating correction data to be used for the shading correction. Next, in step S2, image processor 204 generates the correction data, based on the data acquired in step S1. Then, in step S3, image processor 204 reads the document. At this time, image processor 204 performs the shading correction on the read-out image signal by using the correction data.

[2-2. Data Acquisition Process]

Figure 7:
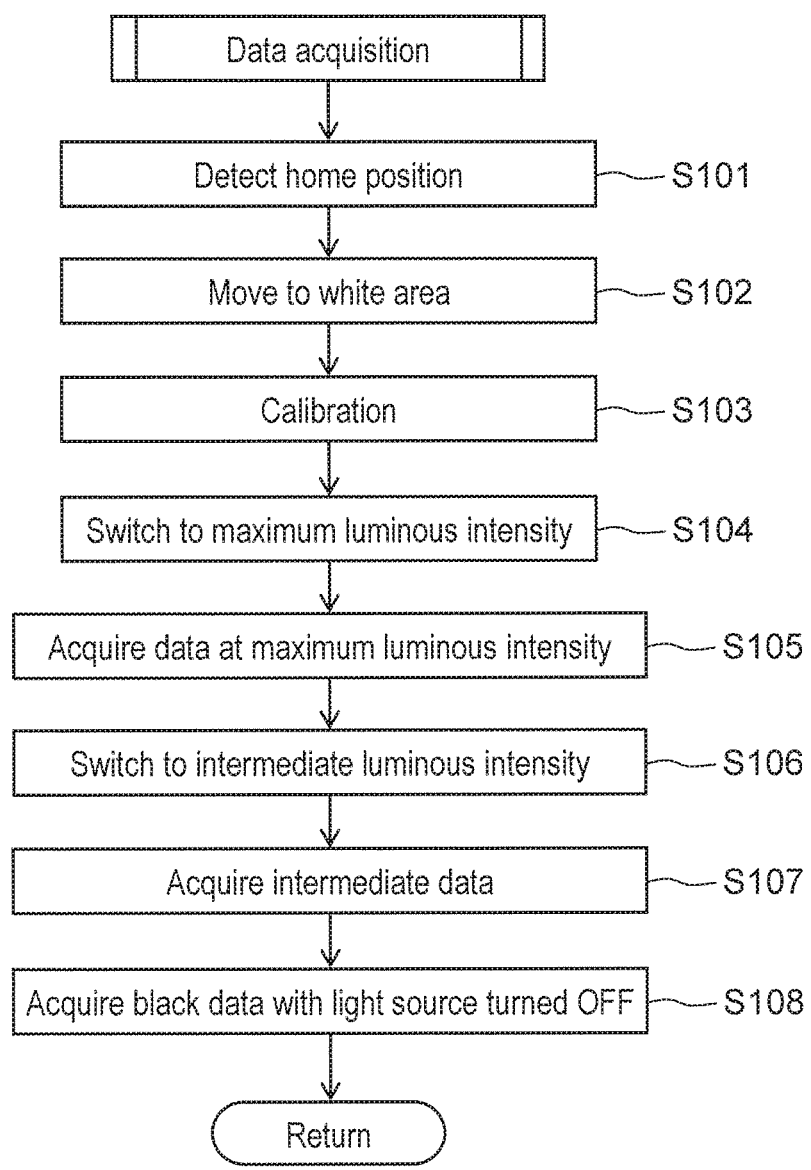
FIG. 7 is a flowchart of a data acquisition process of the image reading device in the first exemplary embodiment.

FIG. 7 is a flowchart of a data acquisition process of image reading device 10 in the first exemplary embodiment.

The process of data acquisition is started upon the operation, for the data acquisition, performed by the user through an operation unit (not shown) of image reading device 10.

First, in step S101, image processor 204 detects the home position of sensor module 102. Specifically, image processor 204 causes, through reading controller 201, sensor module 102 to move to the home position stored in memory 203. This position is a temporary home position. Then, image processor 204 causes sensor module 102 to acquire an image at the home position and determines whether or not reference pattern P is detected from the acquired image. If reference pattern P is detected, image processor 204 determines that the current position of sensor module 102 is precisely at the home position. If reference pattern P is not detected, image processor 204 causes sensor module 102 to move toward one side in the sub-scanning direction to search for reference pattern P. If reference pattern P is detected, image processor 204 finishes detecting the home position. However, if reference pattern P is not detected even when sensor module 102 is moved toward the one side of the sub-scanning direction from the temporary home position by a certain distance, image processor 204 returns sensor module 102 back to the temporary home position and causes sensor module 102 to move toward the other side in the sub-scanning direction to search for reference pattern P. Image processor 204 continues to make sensor module 102 move toward the other side in the sub-scanning direction until reference pattern P is detected. Image processor 204 stores the detected position of the home position in memory 203, and at the next detection of the home position, image processor 204 uses the home position, which is stored in memory 203, as the temporary home position.

Next, in step S102, image processor 204 causes, through reading controller 201, sensor module 102 to move to the position facing white area 31 of white reference plate 14. Because the distance, in the sub-scanning direction, between reference pattern P and white area 31 is known, image processor 204 can cause sensor module 102 to move accurately to the position facing white area 31, based on the home position detected in step S101.

When sensor module 102 has moved to the position facing white area 31, image processor 204 performs calibration in step S103. For example, image processor 204 performs initial setting such as the setting of a lighting time of light source 205 and the setting of AFE 103. By setting the lighting time of light source 205, it is possible to equalize output levels of the image signals being output from the plurality of sensors 207.

When the calibration is completed, then in step S104, image processor 204 reads out from memory 203 the data representing the luminous intensity corresponding to the voltage applied to light source 205, obtains the voltage with which the luminous intensity of light source 205 is maximized, and transmits the information of the voltage to reading controller 201. Reading controller 201 turns on light source 205 and adjusts the voltage, based on the above information, to switch the luminous intensity of light source 205 to the maximum luminous intensity. The maximum luminous intensity is an example of a first luminous intensity.

Next, in step S105, image processor 204 illuminates, through reading controller 201, white reference plate 14 with light source 205 at the maximum luminous intensity, and acquires the image of white reference plate 14. That is, image processor 204 causes sensors 207 to receive light reflected by white reference plate 14 illuminated with the light at the maximum luminous intensity so as to convert the received light into the image signal. The image data based on the image signal at this time, in other words, white data are the image data at the maximum luminous intensity, therefore, the white data represent white at the lightest density level (light amount) of the output level of sensors 207. Image processor 204 stores the white data in memory 203 as white correction data.

Subsequently, in step S106, image processor 204 reads out the data representing the luminous intensity corresponding to the voltage applied to light source 205 from memory 203, and obtains the voltage with which the luminous intensity of light source 205 is not higher than half the maximum luminous intensity and with which light source 205 is not turned off (hereinafter, the intensity is referred to as a "intermediate luminous intensity"), then, image processor 204 transmits the information of the voltage to reading controller 201. Reading controller 201 lowers the voltage applied to light source 205, based on the information to switch the luminous intensity of light source 205 to the intermediate luminous intensity. The intermediate luminous intensity is an example of a second luminous intensity.

Next, in step S107, image processor 204 illuminates white reference plate 14 with light source 205 switched to the intermediate luminous intensity, and acquires the image of white reference plate 14. At this time, the object is white, but the luminous intensity of light source 205 is switched to the intermediate luminous intensity. Therefore, the image data at this time represent the output level of sensors 207 of a color that is at a density level darker than the output level at the maximum luminous intensity and that is relatively close to black. Image processor 204 stores the image data in memory 203 as intermediate data.

When the intermediate data have been acquired, then in step S108, image processor 204 acquires the image with light source 205 turned off (the light source being OFF). Because light source 205 is off, at least the light from light source 205 (that is, the light emitted from light source 205 and reflected by the object) does not enter sensors 207. Therefore, the image data at this time represent the output level of sensors 207 of black that is at the darkest density level. Image processor 204 stores the image data in memory 203 as black data.

[2-3. Correction Data Generation Process]

Image processor 204 generates black correction data as a black reference for the shading correction, from the black data and the intermediate data acquired by the data acquisition process. By using the black data and the intermediate data to generate the black correction data, it is possible to reduce influence of a density unevenness caused by crosstalk to be described in detail later.

Crosstalk, which is interference on the image signals with each other on transmission lines from the plurality of sensors 207 interfere, cause noise on the image signals. In particular, in the configuration in which the image signals are output through FFC 15 as in the case of sensors 207, crosstalk is more likely to be caused by bending of FFC 15.

Figure 8:
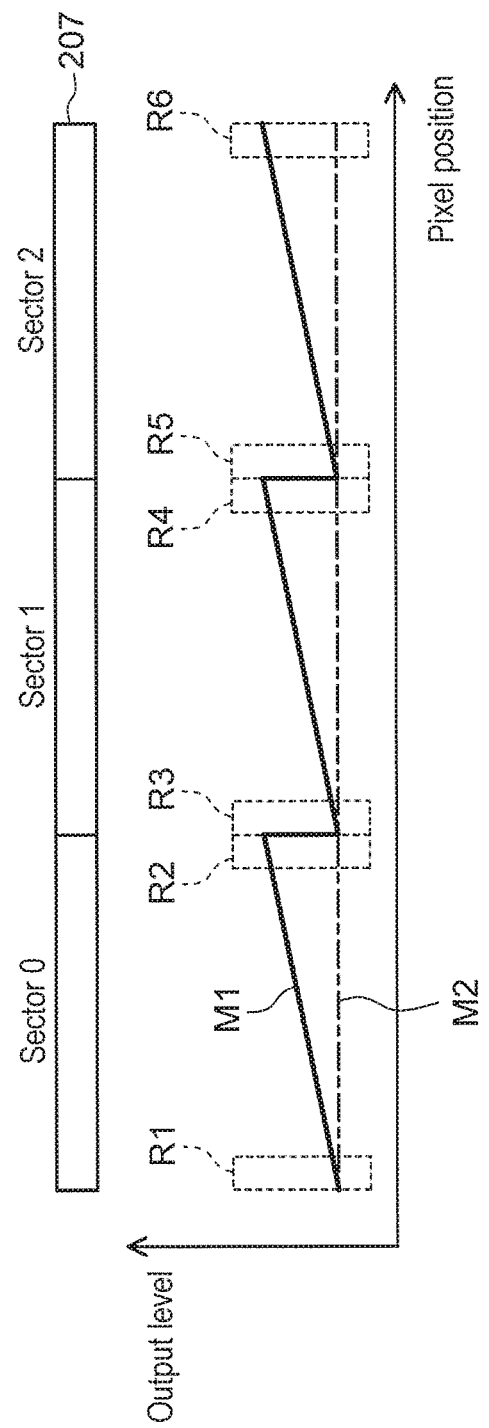
FIG. 8 is a diagram showing an example of an output level of a sensor.

FIG. 8 is a diagram showing an example of the output level of sensors 207. In FIG. 8, one-dot chain line M2 represents the case where there is no crosstalk, and solid line M1 represents the case where there is crosstalk. The vertical axis of FIG. 8 represents the output level of sensors 207, and the horizontal axis represents the position, of the pixels of the sensors 207, in the main scanning direction. For example, in a case where an object with uniform reflectance is imaged, when there is no crosstalk, the output levels of the pixels are substantially constant as represented by one-dot chain line M2 in FIG. 8 if the pixels are assumed to have no individual differences between pixels. However, when crosstalk occurs, the output levels of the pixels change in each sector as represented by solid line M1 in FIG. 8. For example, as shown in FIG. 8, the output levels of the pixels in each sector increase linearly from one end toward the other end of the sector. Further, when there is difference between the output levels of the pixels in each sector, step difference in output level appears at the boundary which sector changes.

Figure 9:
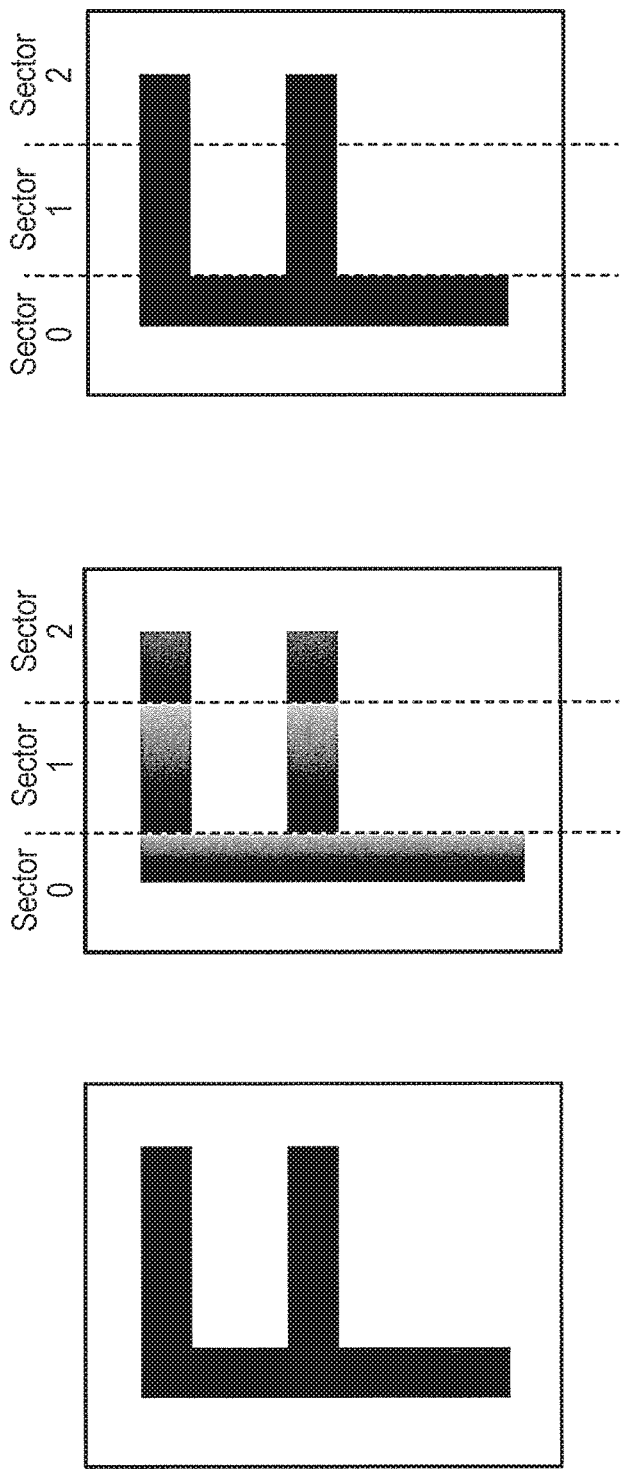
FIG. 9A is a diagram showing an image of a document.
FIG. 9B is a diagram showing a read image on which conventional shading correction has been performed.
FIG. 9C is a diagram showing a read image on which shading correction in the first exemplary embodiment has been performed.

FIG. 9A is a diagram showing an image of document S. FIG. 9B is a diagram showing a read image on which conventional shading correction has been performed. FIG. 9C is a diagram showing a read image on which shading correction in the first exemplary embodiment has been performed.

FIG. 9A shows an example of the image of document S. FIG. 9B shows a read image which is a read image of document S and on which conventional shading correction has been performed. As shown in FIG. 9B, when crosstalk causes noise, a density unevenness occurs in the read image. In the read image of FIG. 9B, a density unevenness appears at the part corresponding to the boundary between the sectors of sensors 207.

Figure 10:
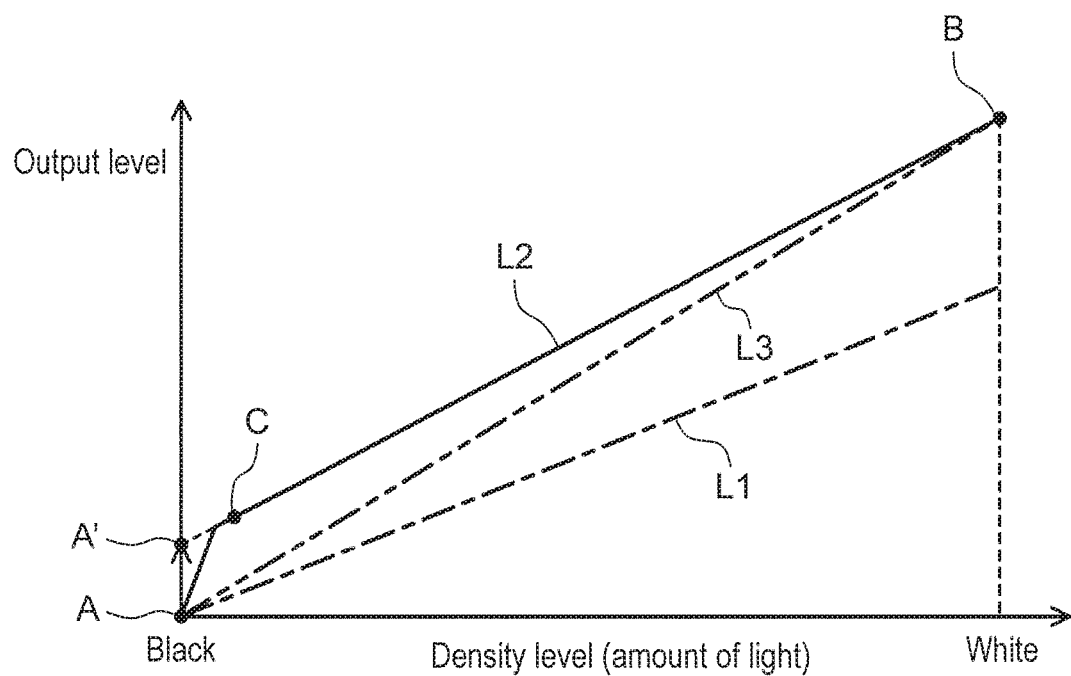
FIG. 10 is a graph showing a relationship of an output level with respect to a density level of a sensor.

Further, FIG. 10 is a graph showing the relationship of the output level of sensor 207 with respect the density level. Each pixel of sensor 207 outputs a voltage signal corresponding to an amount of light. Change in the voltage corresponding to an amount of light depends on characteristics of sensor 207. For example, in a case where the voltage changes linearly depending on an amount of light, the voltage ideally changes as shown by one-dot chain line L1. However, if the noise caused by crosstalk (hereinafter, referred to as an "interference noise") is superposed on the output signal, the voltage changes as shown by solid line L2.

That is, because the output level of black at the darkest density level is low, an interference noise hardly appears on the output signal. However, when the density level becomes a bit lighter than the black, the output level of sensor 207 increases, and the interference noise increases accordingly.

In the case of conventional typical shading correction, image data are acquired with light source 205 turned off (point A), and the image data are used as the black correction data to be the black reference. The image data of white are acquired when light source 205 is on (point B), and the image data are used as the white correction data to be the white reference. By performing shading correction using the thus acquired black correction data and white correction data, an offset and a gain (dynamic range) of each pixel is corrected. However, an interference noise is not likely to affect the image signal acquired while light source 205 is off. For this reason, if the shading correction is performed by using the image data at point A and point B, the shading correction is performed based on the characteristics shown by two-dot chain line L3 different from the actual output characteristics of sensor 207, thus, the shading correction cannot be appropriately performed.

To address this problem, in image reading device 10 of the present disclosure, the black correction data are generated by using the black data and the intermediate data, where the black data are acquired while light source 205 is off and the intermediate data are obtained while the luminous intensity of light source 205 is set at the intermediate luminous intensity.

Figure 11:
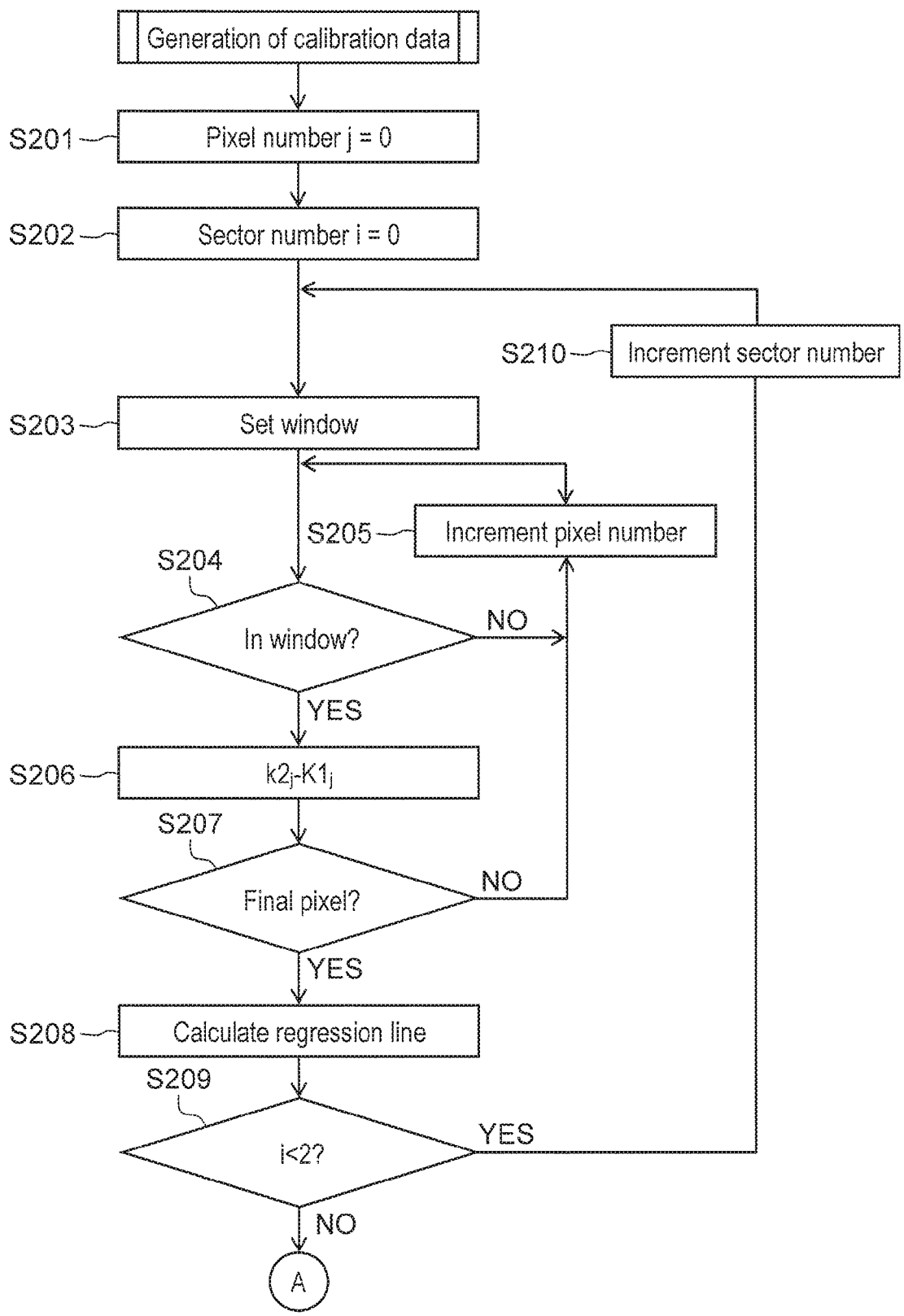
FIG. 11 is a flowchart of a front stage of a correction data generation process of the image reading device in the first exemplary embodiment.
Figure 12:
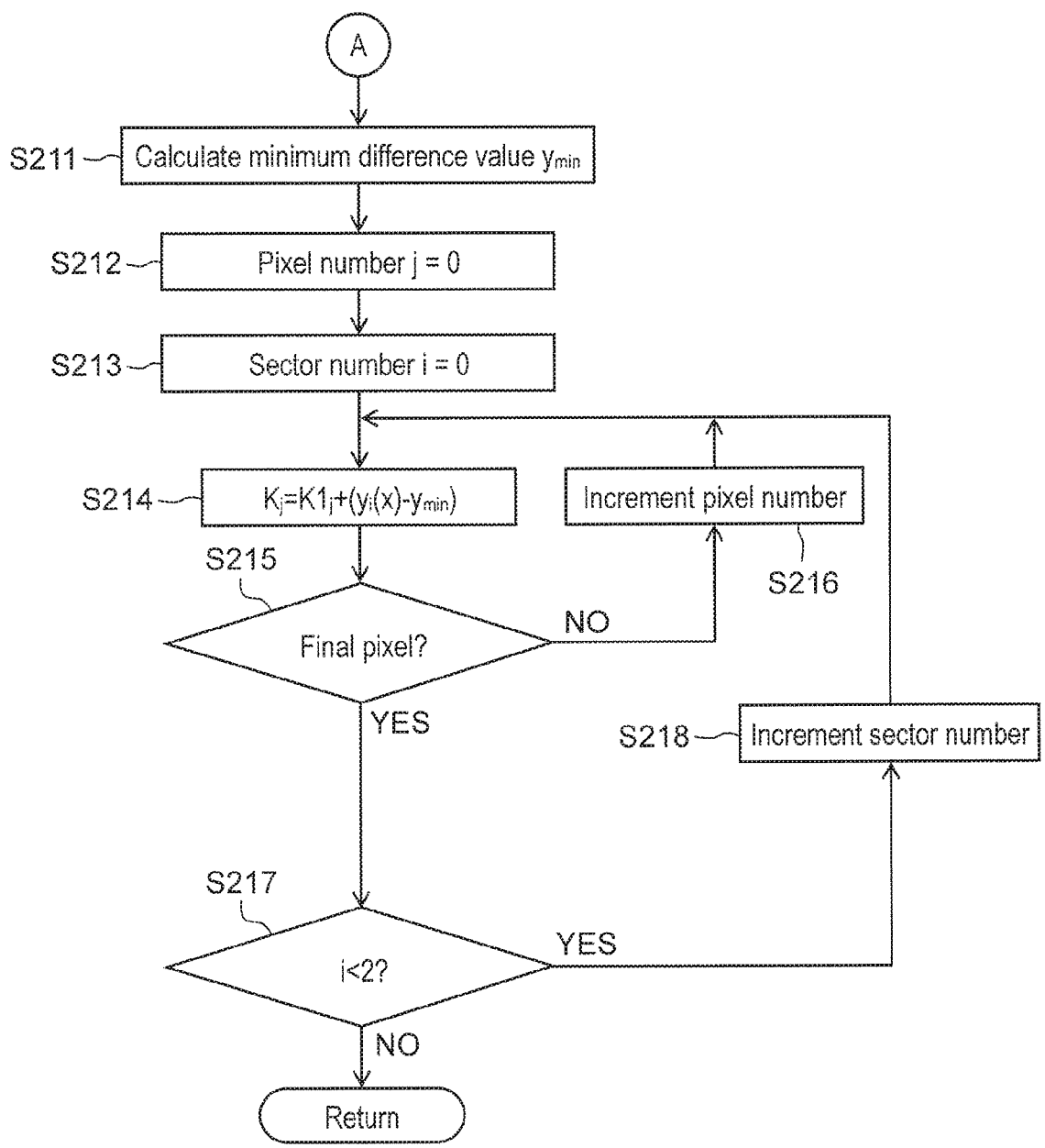
FIG. 12 a flowchart of a rear stage of the correction data generation process of the image reading device in the first exemplary embodiment.
Figure 13:
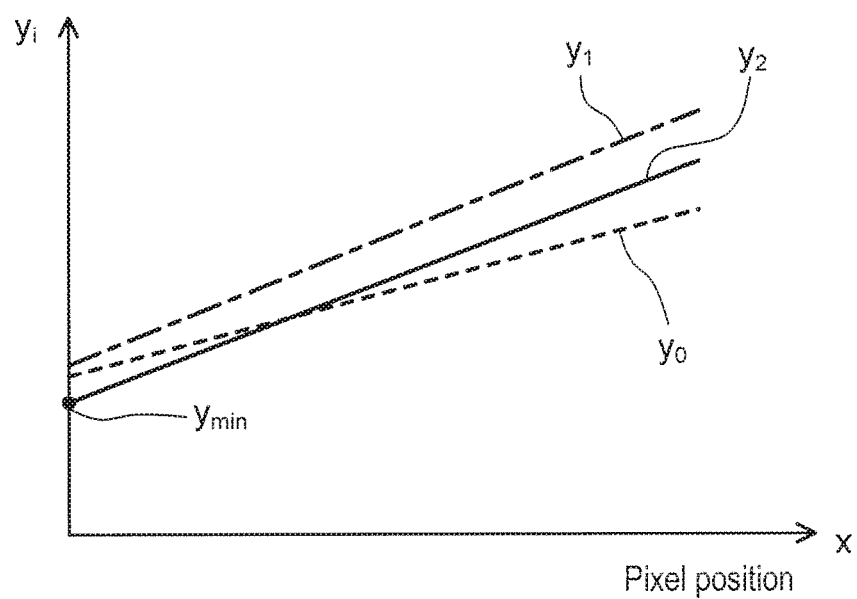
FIG. 13 is a diagram showing a regression line of a difference value in each sector.

FIG. 11 is a flowchart of the front stage of a correction data generation process of image reading device 10 in the first exemplary embodiment. FIG. 12 is a flowchart of the rear stage of the correction data generation process of image reading device 10 in the first exemplary embodiment. FIG. 13 is a diagram showing a regression line of difference values in each sector.

In the following description, the number of sectors and the number of pixels for sensor 207 are respectively three and n. Further, the sector is represented by $S_i$ (i=0 to 2), and the pixel is represented by $X_j$ (j=0 to n−1). Sector $S_0$ is located on one end, of sensor 207, in the main scanning direction, sector $S_1$ is next to sector $S_0$, and sector $S_2$ is next to sector $S_1$ and is located on the other end, of sensor 207, in the main scanning direction. As for the pixels, pixel $X_0$ is on one end, of sensor 207, in the main scanning direction, and the pixel having a larger pixel number j is closer to the other end in the main scanning direction, where pixel $X_{n-1}$ is on the other end, of sensor 207, in the main scanning direction.

In step S201, image processor 204 sets the pixel number j to 0. Further, in step S202, image processor 204 sets sector number i to 0.

Next, in step S203, image processor 204 sets an area (window) in which difference values to be described later are calculated in each sector. In detail, as shown in FIG. 8, windows are set at one end and at the other end, in each sector, in the main scanning direction. A width of each window is set to include a predetermined number of pixels. In FIG. 8, in sector $S_0$, start window R1 and end window R2 are respectively set at one end and the other end in the main scanning direction. Similarly, in sector $S_1$, start window R3 and end window R4 are respectively set at one end and the other end in the main scanning direction. Further, in sector $S_2$, start window R5 and end window R6 are respectively set at one end and the other end in the main scanning direction.

In step S204, image processor 204 determines whether or not pixel $X_j$ is included in the window. For example, because the equation is j=0 just after step S201, pixel $X_j$ is included in start window R1 of sector $S_0$.

If the pixel $X_j$ is outside the window, image processor 204 increments the pixel number j in step S205 and performs the process of step S204 again. That is, image processor 204 determines whether or not the next pixel $X_j$ is included in the window.

On the other hand, if pixel $X_j$ is in the window, image processor 204 calculates, in step S206, a difference value ($K2_j$–$K1_j$) between an output level $K2_j$ of the intermediate data of pixel $X_j$ and an output level $K1_j$ of the black data of pixel $X_j$, and stores the calculated difference value in memory 203.

After that, in step S207, image processor 204 determines whether or not pixel $X_j$ is the final pixel in sector $S_i$. If pixel $X_j$ is not the final pixel, image processor 204 increments, in step S205, the pixel number j, and performs the process of step S204 again.

On the other hand, if pixel $X_j$ is the final pixel, image processor 204 calculates, in step S208, a regression line of the difference values in sector $S_i$. Specifically, as shown in FIG. 13, image processor 204 calculates a regression line $y_i(x) = a_i \times x + b_i$ of the difference value of the pixel included in the start window in sector $S_i$ and the difference value of the pixel included in the end window, where x is the pixel position in the sector, $y_i$ is the difference value, i is a sector number, $a_i$ is the coefficient (inclination) of the regression line, $b_i$ is the coefficient (constant term) of the regression line. Image processor 204 stores the calculated coefficients $a_i$ and $b_i$ of the regression line in memory 203. In FIG. 13, dotted line y0 represents the regression line in sector $S_0$, solid line y2 represents the regression line in sector $S_1$, and one-dot chain line y3 represents the regression line in sector $S_2$.

Next, in step S209, image processor 204 determines whether or not the sector number i is smaller than 2. If the sector number i is smaller than 2, image processor 204 increments, in step S210, the sector number i, and performs the process of step S203 again. That is, unless sector $S_i$ in which the regression line has been calculated is the final sector (that is, sector $S_2$), image processor 204 changes sector $S_i$ to the next sector $S_{i+1}$ and repeats the calculation of the regression line.

On the other hand, if the sector number i is not less than 2, practically, if the sector number is 2, image processor 204 finishes the front stage of generating the correction data.

Subsequently, image processor 204 performs the process of the rear stage of generating the correction data. In detail, as shown in FIG. 13, image processor 204 obtains, in step S211, the minimum difference value $y_{min}$ ($y_{min}$=min($y_i$)) in the three regression lines y0 to y2, stored in memory 203, of sector $S_0$, sector $S_1$, and sector $S_2$. That is, the minimum difference value $y_{min}$ is the smallest minimum value, of the minimum values in the regression line of each sector, in the three sectors.

Next, image processor 204 sets, in step S212, the pixel number j to 0. Subsequently, image processor 204 sets, in step S213, the sector number i to 0.

Then, image processor 204 corrects, in step S214, the output level $K1_j$ of pixel $X_j$ of the black data by using the minimum difference value $y_{min}$, and thus obtains the black correction data. Specifically, the correction value $K_j$ for pixel $X_j$ of the black correction data is expressed by the following equation.

$$K_j = K1_j + (y_i(x) - y_{min})$$

Next, image processor 204 determines, in step S215, whether or not pixel $X_j$ is the final pixel in sector $S_i$. If pixel $X_j$ is not the final pixel, image processor 204 increments, in step S216, the pixel number j, and performs the process of step S214 again.

On the other hand, in step S217, if pixel $X_j$ is the final pixel, image processor 204 determines whether or not the sector number i is smaller than 2. If the sector number i is smaller than 2, image processor 204 increments, in step S218, the sector number i, and performs the process of step S214 again. That is, unless sector $S_i$ in which the black correction data have been calculated is the final sector (that is, sector $S_2$), image processor 204 changes sector $S_i$ to the next sector $S_{i+1}$ and repeats the calculation of the black correction data.

On the other hand, if the sector number i is not less than 2, practically, if the sector number is 2, image processor 204 finishes the rear stage of generating the correction data.

As described above, image processor 204 calculates the correction value $K_j$ of the black correction data by adding the value obtained by subtracting the minimum difference value $y_{min}$ from the difference value $y_i(x)$ of each sector to the output level $K1_j$ of the black data.

[2-4. Reading Process]

When the black correction data and the white correction data have been calculated, image processor 204 performs a reading process. Specifically, image processor 204 causes, through reading controller 201, sensor module 102 to move and perform the reading process of the image of document S. Image processor 204 performs the shading correction on the read image, by using the black correction data and the white correction data.

Because the black data acquired in step S105 have a very small output level themselves, the interference noise included in the black data is also very small (see point A in FIG. 10). On the other hand, the intermediate data are on the lighter density level side than the black data, and the output level is large, therefore, an interference noise appears on the intermediate data (see point C in FIG. 10). By correcting the black data by using the intermediate data, it is possible to generate the black correction data containing the interference noise.

Although the intermediate data are acquired while light source 205 is on, the luminous intensity is lowered down to the intermediate luminous intensity, therefore, the output caused by the reflected light of white reference plate 14 illuminated with the intermediate luminous intensity is sufficiently low, whereby the interference noise is contained for the most part of the output. Further, because the intermediate luminous intensity is a luminous intensity that is less than the half of the maximum luminous intensity and is reduced to an extent that light source 205 is not turned off, the output caused by the reflected light from white reference plate 14 illuminated with the intermediate luminous intensity is larger than the output of the black data but is sufficiently small. Therefore, the difference value ($K2_j$–$K1_j$) between the output level of the intermediate data and the output level of the black data can be regarded as approximately the interference noise. In the present disclosure, the difference value ($K2_j$–$K1_j$) is linear-regressed, and the offset of the difference value ($K2_j$–$K1_j$) in each sector is corrected, however, in principle, the black correction data containing the interference noise are generated by adding the difference value ($K2_j$–$K1_j$) to the black data. That is, the data at point A' in FIG. 10 are generated.

By performing the shading correction using the black correction data (point A' in FIG. 10) containing the interference noise and the white correction data (point B in FIG. 10) initially containing the interference noise, it is possible to perform the shading correction based on the actual output, of sensor 207, including the interference noise. As a result, as shown in FIG. 9C, the density unevenness at the part, of the read image, corresponding to the boundary of sectors of sensors 207 is reduced, whereby the read image close to the image of document S in FIG. 9A can be obtained.

Note that, when image processor 204 serially reads images of a plurality of documents S, the white data, the intermediate data, and the black data are acquired before every reading at the time of image reading for each document S. Then, the shading correction of the image data of each document S is performed after the black correction data and the white correction data are generated based on the white data, the intermediate data, and the black data acquired every time before every reading.

[3. Conclusion]

Image reading device 10 of the present disclosure includes: sensor module 102 that includes light source 205 to illuminate an object on FB glass 12 and ADF glass 13 and includes a plurality of sensors 207 to read light reflected from the object to acquire image signals; white reference plate 14; image processor 204 that generates correction data to be used for shading correction and performs the shading correction on the image signals acquired by the plurality of sensors 207 by using the correction data. The plurality of sensors 207 are arranged in a predetermined main scanning direction, the image signals of the sensors constitute an image signal on a line extending in the main scanning direction, and light source 205 can switch between at least a maximum luminous intensity and a intermediate luminous intensity lower than the maximum luminous intensity. Image processor 204 acquires intermediate data by causing the plurality of sensors 207 to acquire image signals of white reference plate 14 illuminated with the intermediate luminous intensity, generates black correction data as a black reference for the shading correction, based on the intermediate data, and performs the shading correction by using the black correction data, so that a density unevenness, in an image, caused by interference between the image signals from the plurality of sensors 207 is corrected.

With this configuration, the intermediate data are acquired by acquiring the image signal while the luminous intensity of light source 205 is lowered down to the intermediate luminous intensity, therefore, the intermediate data contain an interference noise to a certain extent. Thus, the black correction data are generated based on the intermediate data, so that the black correction data containing an interference noise are generated. By performing the shading correction using the thus generated black correction data, the density unevenness, in the image, caused by the interference between the image signals is corrected.

Further, image processor 204 acquires the intermediate data from the image signal of white reference plate 14 illuminated with the intermediate luminous intensity. Therefore, it is not necessary to separately provide a reference member on image reading device 10 to acquire the intermediate data, and the configuration of image reading device 10 can thus be simple.

Further, image processor 204 acquires black data based on the output of the plurality of sensors 207 while light source 205 is off, and generated the black correction data, based on the black data and the intermediate data.

With this configuration, the black data are the data of black at a density level darker than the intermediate data. However, the density level of the black data is dark, therefore, the output level itself is low, whereby the contained interference noise is small. That is, although the black data are the data of black at a dark density level, the interference noise does not appear appropriately. On the other hand, although the density level of the intermediate data is lighter than a reference level, the intermediate data contains an interference noise to a certain extent. Therefore, by generating the black correction data, based on the black data and the intermediate data (for example, the black data are corrected by the intermediate data), it is possible to generate the black correction data that are at a dark density level and contain an interference noise.

Further, image processor 204 acquires white data by causing the plurality of sensors 207 to acquire an image signal of white reference plate 14 illuminated with the maximum luminous intensity, generates white correction data as a white reference for the shading correction, based on the white data, and performs the shading correction by using the black correction data and the white correction data.

With this configuration, the white data contain the interference noise, and the white correction data also contain the interference noise. Thus, the shading correction is performed with the black correction data containing the interference noise and the white correction data containing the interference noise, therefore, it is possible to appropriately perform the shading correction based on an actual output of sensors 207.

Further, the intermediate luminous intensity is half the maximum luminous intensity or lower.

With this configuration, it is possible to acquire the data, which contain a certain level of noise, at a dark density level which is close to black as the intermediate data generated from the image signal of white reference plate 14 illuminated with the intermediate luminous intensity.

Further, the luminous intensity of light source 205 is switched by the voltage, applied to light source 205, being controlled.

With this configuration, it is possible to adjust the luminous intensity without using many LEDs as light source 205, and the configuration of sensor module 102 can thus be simple.

Further, in a case where the images of a plurality of documents S are sequentially read, image processor 204 acquires the white data, the intermediate data, and the black data every time when the image of each of the plurality of documents S is read.

In particular, no operation of user is required to acquire the white data, the intermediate data, and the black data, therefore, even if the acquisition is performed at every reading of each image of a plurality of documents S, it does not take a long time. By this operation, it is possible to correct also temporal change of shading such as temperature characteristics.

Other Exemplary Embodiments

The first exemplary embodiment is described above as an example of the technologies disclosed in the present disclosure. However, the technologies of the present disclosure can apply not only to the above exemplary embodiment but can also apply to exemplary embodiments in which modification, replacement, addition, or removal is appropriately made. Further, it is possible to combine the components disclosed in the above exemplary embodiment to make a new exemplary embodiment. Further, the components described in the accompanying drawings and in the detailed description include components necessary for solving the problems, but in addition, in order to exemplify the above implementation, the components can also include components unnecessary for solving the problems. For this reason, it should not be immediately recognized that those unnecessary components are necessary just because the fact that those unnecessary components are described in the accompanying drawings and the detailed description.

Note that, the first exemplary embodiment may be configured as described below.

For example, in the case described in the first exemplary embodiment, the plurality of sensors 207 are divided into three sectors, however, there is no limitation in the division number of sectors.

Further, in the first exemplary embodiment, description is given to the case that the reference member is configured with plate-shaped white reference plate 14, however, the present disclosure is not limited to this case, and white reference plate 14 may be achieved by other configurations, for example, white reference plate 14 may be provided integrally with a chassis.

Further, scanner unit 11 is connected to controller 100 through, without being limited thereto, FFC 15. Any communication cable can be used as the wires between scanner unit 11 and controller 100. For example, scanner unit 11 and controller 100 may be connected by an FPC (Flexible Printed Circuits) or the like.

Further, the order of performing the steps of the flowcharts in the first exemplary embodiment may be arbitrarily changed as long as a desired object is achieved, and further, some steps can be performed parallely. For example, the order may be changed between the calibration, the acquisition of the white data, the acquisition of the intermediate data, the acquisition of the black data, and the like. Further, in the above description, after the data are acquired (step S1), the correction data are generated (step S2), however, the correction data may be generated (step S2) while the data are being acquired and just after the white data are completely acquired (for example, before the intermediate data start to be acquired).

Further, in the first exemplary embodiment, image processor 204 functions as the data generator and the corrector, but it is not limited thereto. The data generator and the corrector may be different components. Further, the data generator and the corrector do not have to be image processor 204, and another processor different from image processor 204 may function as the data generator or the corrector.

Further, in the first exemplary embodiment, the luminous intensity of light source 205 is controlled by adjusting the voltage applied to the LED, however, without being limited thereto, light source 205 may be configured with an LED group made up of a plurality of LEDs, and the luminous intensity may be controlled by adjusting LED which is to be turned on. For example, the whole luminous intensity is controlled in such a manner that, in order to switch the luminous intensity to the maximum luminous intensity, the LEDs are all turned on and that, in order the luminous intensity is switched to the intermediate luminous intensity, not more than half the LEDs are turned on. Alternatively, a high intensity LED and an LED whose luminous intensity is lower than the high intensity LED are disposed, and it is possible to adjust the luminous intensity by turning on one of or both of the LEDs, depending on the required luminous intensity. Further, it is possible to combine the above adjustment methods and the adjustment method based on voltage.

Further, in the first exemplary embodiment, the white correction data and the black correction data are generated based on the three levels of light intensities, the maximum luminous intensity, the intermediate luminous intensity, and the off, however, it is possible to configure such that the luminous intensity of the light source can be switched to four or more levels of light intensities, and the black correction data and the white correction data may be generated based on the image signals of white reference plate 14 illuminated with different levels of luminous intensity.

As described above, the technologies disclosed in the present disclosure are useful for image reading devices.

What is claimed is:

1. An image reading device that reads an image of an object, the image reading device comprising:
   a sensor module, the sensor module including:
      a light source that illuminates the object; and
      a plurality of sensors that read light reflected from the object to acquire image signals;
   a reference member having a white area;
   a data generator that generates correction data to be used for shading correction; and
   a corrector that performs, by using the correction data, shading correction on the image signals acquired by the plurality of sensors,
   wherein the plurality of sensors are arranged in a predetermined main scanning direction and are configured such that the image signals of the plurality of sensors constitute an image signal on a line extending in the main scanning direction,
   the light source is configured to switch between a first luminous intensity and a second luminous intensity lower than the first luminous intensity,
   the data generator acquires intermediate data by causing the plurality of sensors to acquire an image signal of the white area of the reference member illuminated with the second luminous intensity, and generates black correction data as a black reference for the shading correction, and
   the corrector corrects a density unevenness, in an image, caused by interference between image signals from the plurality of sensors, by performing the shading correction using the black correction data.

2. The image reading device according to claim 1, wherein the data generator acquires black data by causing the plurality of sensors to acquire an image signal with the light source turned off, and generates the black correction data, based on the black data and the intermediate data.

3. The image reading device according to claim 2, wherein the data generator acquires white data by causing the plurality of sensors to acquire an image signal of the white area on the reference member illuminated with the first luminous intensity, and generates white correction data as a white reference for the shading correction, based on the white data.

4. The image reading device according to claim 3, wherein the second luminous intensity is not higher than half the first luminous intensity.

5. The image reading device according to claim 4, wherein the luminous intensity of the light source is switched by adjusting a voltage applied to the light source.

6. The image reading device according to claim 3, wherein the luminous intensity of the light source is switched by adjusting a voltage applied to the light source.

7. The image reading device according to claim 3, wherein in a case that images of a plurality of the objects are sequentially read, the data generator acquires the white data, the intermediate data, and the black data every time when the image of each of the plurality of objects is read.

8. The image reading device according to claim 2, wherein the second luminous intensity is not higher than half the first luminous intensity.

9. The image reading device according to claim 8, wherein the luminous intensity of the light source is switched by adjusting a voltage applied to the light source.

10. The image reading device according to claim 2, wherein the luminous intensity of the light source is switched by adjusting a voltage applied to the light source.

11. The image reading device according to claim 1, wherein the data generator acquires white data by causing the plurality of sensors to acquire an image signal of the white area on the reference member illuminated with the first luminous intensity, and generates white calibration data as a white reference for the shading calibration, based on the white data.

12. The image reading device according to claim 11, wherein the second luminous intensity is not higher than half the first luminous intensity.

13. The image reading device according to claim 12, wherein the luminous intensity of the light source is switched by adjusting a voltage applied to the light source.

14. The image reading device according to claim 11, wherein the luminous intensity of the light source is switched by adjusting a voltage applied to the light source.

15. The image reading device according to claim 11, wherein in a case that images of a plurality of the objects are sequentially read, the data generator acquires the white data, the intermediate data, and the black data every time when the image of each of the plurality of the objects is read.

16. The image reading device according to claim 1, wherein the second luminous intensity is not higher than half the first luminous intensity.

17. The image reading device according to claim 16, wherein the luminous intensity of the light source is switched by adjusting a voltage applied to the light source.

18. The image reading device according to claim 1, wherein the luminous intensity of the light source is switched by adjusting a voltage applied to the light source.

* * * * *